July 5, 1932. L. J. CHRISTMANN 1,866,296
METHOD AND APPARATUS FOR MEASURING FROTH
Filed May 15, 1928
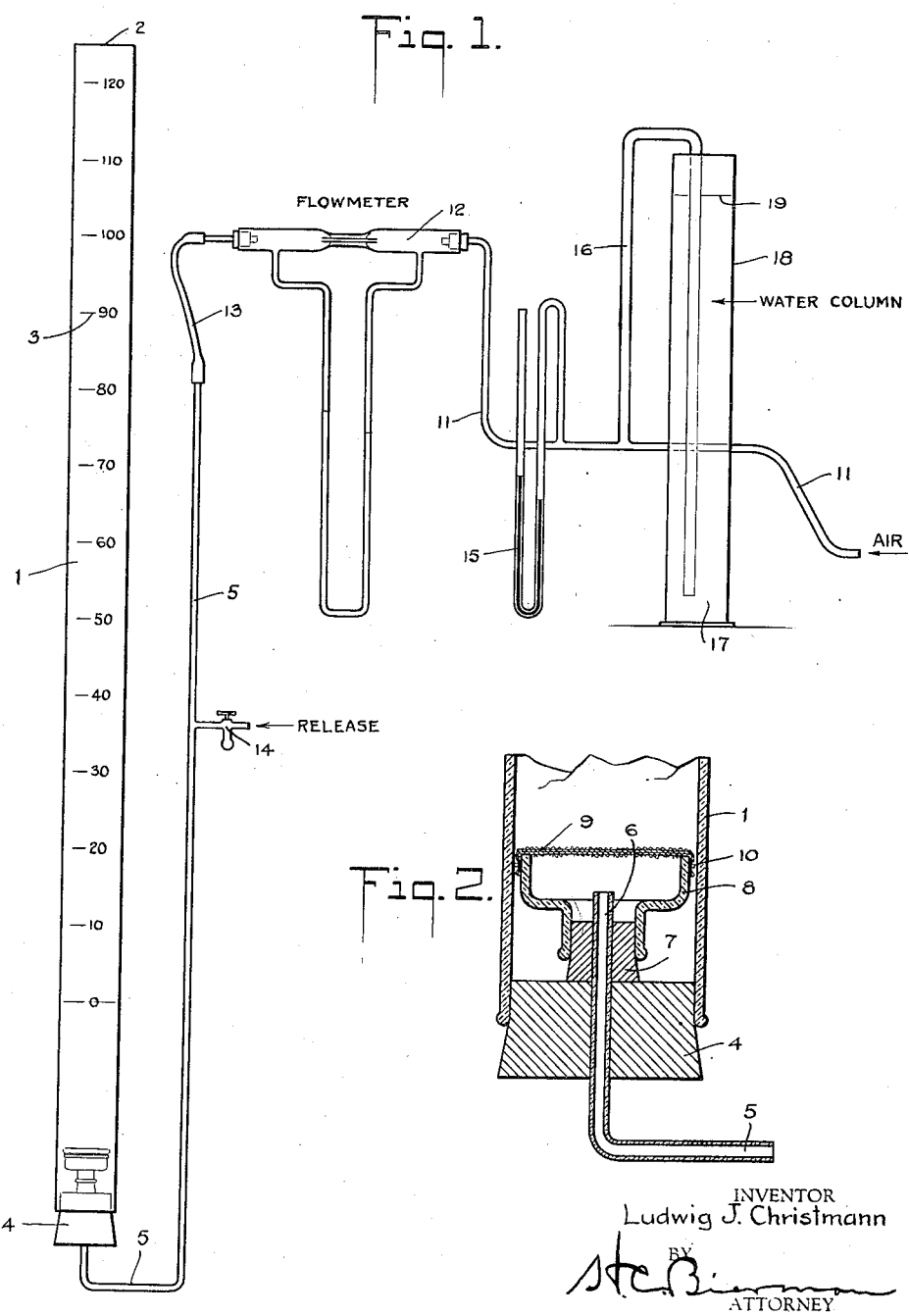
INVENTOR
Ludwig J. Christmann
BY
ATTORNEY Patented July 5, 1932

1,866,296

UNITED STATES PATENT OFFICE

LUDWIG J. CHRISTMANN, OF JERSEY CITY, NEW JERSEY, ASSIGNOR TO AMERICAN CYANAMID COMPANY, OF NEW YORK, N. Y., A CORPORATION OF MAINE

METHOD AND APPARATUS FOR MEASURING FROTH

Application filed May 15, 1928. Serial No. 277,933.

This invention relates to the measurement of the frothing properties of materials, more particularly of materials in two phase systems.

In a number of industrial applications frothing materials, that is, substances which when introduced into a liquid and then suitably treated produce a froth, are fairly common. One very large application for substances of this character is in the froth flotation of sulphide and other minerals. In processes of this kind, the ore is introduced into water containing suitable conditioning agents and one or more froth producing substances. Air or other gas is introduced into the solution causing the formation of bubbles of froth which carry the valuable constituents of the ore and which rise to the surface.

Heretofore, as far as I am aware, there has been no means for accurately measuring or gauging the relative values of various materials as frothing agents. Some very inaccurate measure could be obtained by noting the general character of the froth produced in a flotation or other operation, but a direct comparison and an accurate measure of the frothing properties of materials had never before been obtained.

My invention is intended to provide a method of measuring the frothing properties of materials which is accurate and simple, which gives a true indication of the frothing properties of the materials and a very accurate comparison of the relative values thereof for frothing purposes. My invention also contemplates an apparatus for carrying out my method, which apparatus is also very simple, easily manipulated, easy and cheap to produce and the parts of which are readily replaceable.

In practicing my new method I provide a chamber, usually in the form of a tube, in which I place water or other liquid to act as the carrier medium for the materials to be tested. To a predetermined amount of the liquid I add a measured amount of the frothing material and bubble through the same a gas such as air, preferably at constant pressure, causing agitation of the liquid and the production of a froth which rises in the tube to a certain maximum height which is measured. By such a measurement I am enabled to obtain the volume of froth produced by a given amount of standard frothing material.

The flow of gas is then turned off and the time required for the frothing to subside is noted. This gives a measure of the toughness of the froth which I denote as the breaking co-efficient.

In the accompanying drawing constituting a part hereof, and in which like reference characters indicate like reference parts, Figure 1 is a view in elevation of an apparatus constituting part of my invention, and Figure 2 is an enlarged, fragmentary, vertical, cross-sectional view of the air or gas inlet portion of the apparatus.

As shown in the drawing I provide a relatively long tube 1, generally of glass or other transparent or translucent material which is open at the top 2. The tube carries graduations 3 which start from a point near the bottom of the tube and extend to the top thereof. The lower end of the tube is closed by a stopper 4 and a pipe 5 passes therethrough into the tube. The end 6 of pipe 5 is inserted in a small stopper 7 which in turn closes the lower portion of bell shaped member 8. The upper portion thereof is covered with fabric or wire gauze 9 which is held securely to the bell 8 by wire or cord 10. Air or other gas is introduced through pipe 11 passing through flow meter 12 and then to pipe 5 by connection 13. A release valve 14 is provided in pipe 5, and a manometer 15 is inserted in pipe 11 as a check for the flow of air through the system.

Extending from pipe 11 is a vertical pipe 16, the free end of which faces vertically downward in the bottom 17 of vessel 18, which is filled with water or other liquid up to the constant lever 19. This functions as a constant pressure means for maintaining the flow of air through the system at the desired pressure.

In the operation of the device for the measurement of the frothing properties of materials, water or other liquid is introduced into the tube 1 filling the same up to the zero point on the scale 3. Air under a pressure of say 1 pound is introduced into pipe 11, traveling past manometer 15 through flow meter 12, through pipe 5, into bell 8 and then through the pores of the fabric 9, whereby it is evenly distributed over the entire cross-sectional area of the tube 1. Because of the water column 18 in the circuit the excess pressure of the air causes part thereof to pass through pipe 16 through the water column and out of the system, thereby maintaining the pressure of the system constant. The air bubbling through the water in tube 1 causes the formation of a small amount of froth probably due to impurities in the water which amount is measured and is taken as the blank. The supply of air is then cut off and the time necessary for the small amount of froth to subside is noted on a stopwatch and is measured in seconds. This also constitutes a measurement for the blank.

To measure the frothing properties of a material a suitable amount of the material, such as cresylic acid, is dropped into tube 1 through the open top 2. Air is again caused to flow through the system at a constant pressure, and the height of the column of froth is measured on scale 3.

In order to obtain the volume co-efficient of the frothing material I measure the height of the froth in centimeters and I measure the amount of frothing material introduced in milligrams. The volume co-efficient is the net height of the column of froth, that is, the height of the column minus the height of the column of froth produced by the water alone (the blank), divided by the amount of frothing material in milligrams.

The supply of air is then turned off and by means of a stopwatch the time necessary for the froth to subside is noted. The net time in seconds is obtained by subtracting the total time elapsed from the time necessary for the blank to subside. In order to obtain the breaking co-efficient, that is, the measure of the toughness of the froth, I divide the net time in seconds by the net height of the froth in centimeters.

By the above described method and apparatus, I have compared the frothing properties of a large number of frothing materials under various conditions. As an example of such measurements I have taken German cresylic acid under a number of conditions of hydrogen ion concentration, and have determined the frothing properties thereof, as shown by the following table, in which B. C. indicates the breaking co-efficient and V. C. indicates the volume co-efficient.

| pH | Average B. C. | Average V. C. |
|---|---|---|
| 5.2 | 0.45 | 0.061 |
| 6.0 | 0.47 | 0.045 |
| 7.0 | 0.38 | 0.43 |
| 8.0 | 0.31 | 0.25 |
| 9.0 | 0.29 | 0.48 |
| 10.0 | 0.31 | 0.32 |

I have tested in the manner above described substantially all of the materials used in the flotation of ores and have obtained uniformly accurate and comparative values of the frothing properties thereof. I have been enabled to so accurately gauge the comparative values of these substances, that it has become possible to predict merely from the above described tests, how the various froth producing reagents will perform in the actual flotation circuit.

This invention is not limited to the testing of the frothing properties of materials for the flotation of ores, either in the presence or in the absence of any minerals, but is also applicable to the testing of frothing properties of materials for any use whatsoever, such as materials for use in the preparation of emulsions and the like.

My invention is broad and controlling and is to be construed as covering the measurement of the frothing properties of materials except as limited by the claims appended hereto.

What I claim is:

1. A method of measuring the frothing properties of materials which comprises placing liquid in a tube, adding a frothing material thereto, bubbling a gas through said liquid to produce a froth, noting the height of the column of froth and allowing said column to subside and noting the time required for said column to subside.

2. A method of measuring the frothing properties of materials which comprises placing liquid in a tube, adding a frothing material thereto, bubbling a gas through said liquid to produce a froth, noting the height of the column of froth, stopping the flow of gas and noting the time necessary for said column to subside.

3. A method of measuring the frothing properties of materials which comprises placing liquid in a tube, adding a frothing material thereto, bubbling a gas through said liquid to produce a froth, noting the height of the column of froth, stopping the flow of gas, noting the time necessary for said column to subside, and dividing said time by said height to obtain the breaking co-efficient.

4. A method of measuring the frothing properties of materials which comprises placing liquid in a tube, adding a frothing material thereto, bubbling a gas through said liquid to produce a froth, measuring the height of the column of froth, subtracting from said height the height of the column of froth similarly produced in the absence of said frothing material, dividing the net height so obtained by the amount of frothing material used to obtain the volume co-efficient, noting the height of the column of froth, stopping the flow of gas, noting the time necessary for said column to subside, and dividing said time by said height to obtain the breaking co-efficient.

In testimony whereof, I have hereunto subscribed my name this 12th day of May, 1928.

LUDWIG J. CHRISTMANN.